(No Model.)
G. W. ZEIGLER.
TRESTLE.
No. 374,107. Patented Nov. 29, 1887.
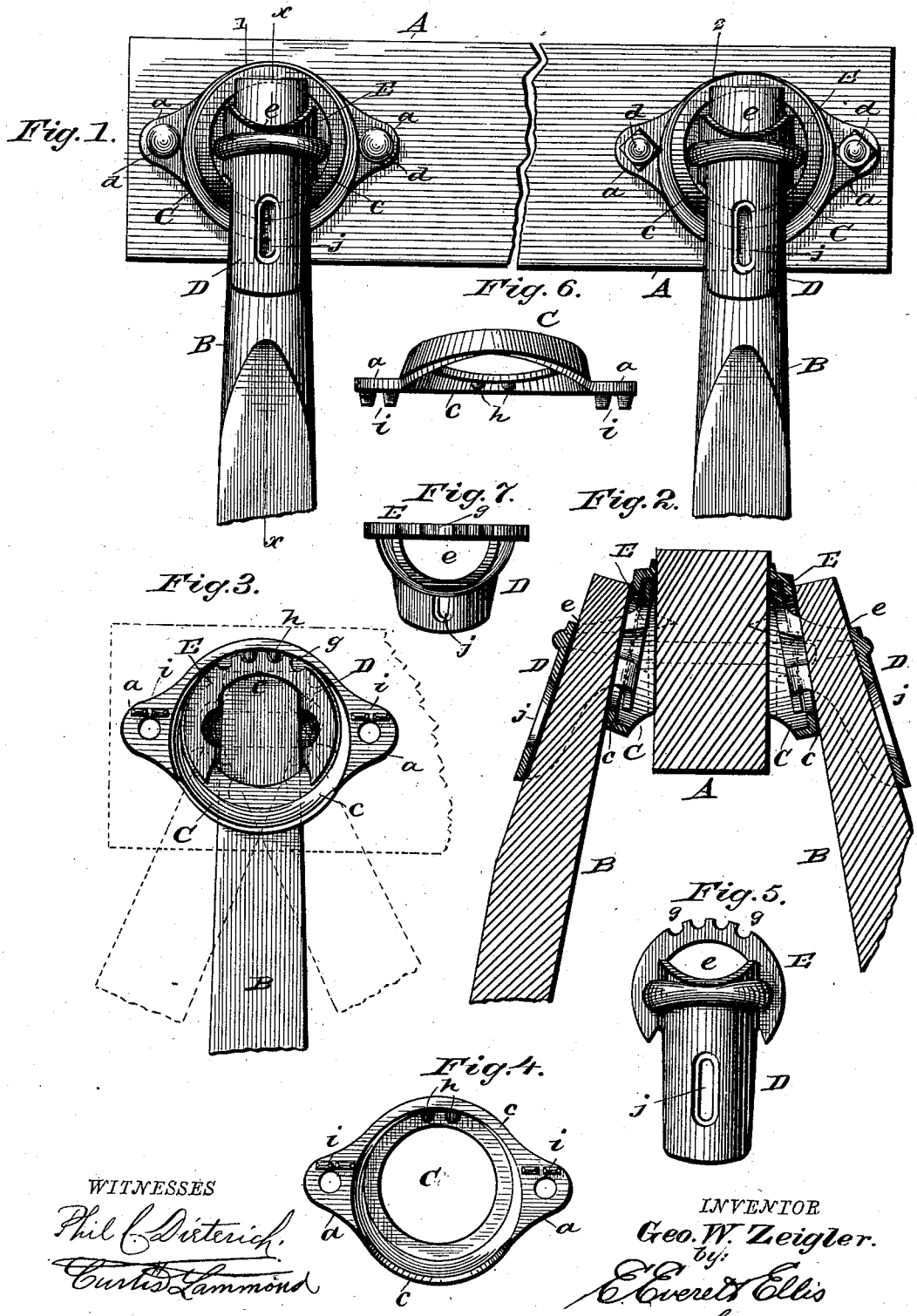
WITNESSES
INVENTOR
Geo. W. Zeigler.
by E. Everett Ellis
his Attorney

UNITED STATES PATENT OFFICE.

GEORGE W. ZEIGLER, OF WASHINGTON, DISTRICT OF COLUMBIA.

TRESTLE.

SPECIFICATION forming part of Letters Patent No. 374,107, dated November 29, 1887.

Application filed March 28, 1887. Serial No. 232,720. (No model.)

*To all whom it may concern:*

Be it known that I, GEORGE W. ZEIGLER, a citizen of the United States, residing at Washington, in the District of Columbia, have invented certain new and useful Improvements in Adjustable Trestles; and I do hereby declare the following to be a full, clear, and exact description of the invention, such as will enable others skilled in the art to which it appertains to make and use the same.

This invention relates to certain new and useful improvements in trestles; and it consists substantially in the same as constructed, and in such peculiar arrangement and combinations of parts as will hereinafter be more particularly described, and pointed out in the claims.

The object of the invention is to provide an improved socket or clamp by which the legs of a trestle may be adjusted to varying degrees of inclination or pitch with respect to the connecting-beam or ledger, thereby lessening or increasing at will the height of such ledger in conformity to requirements of use, and also obtaining varying positions of brace or support.

Further, the invention has for its object to provide an improved structure for the support of tents, hammocks, swings, and the like, that can readily be erected and again collapsed or folded together to occupy minimum space in transportation.

Finally, the invention has such other objects in view as will appear from the description hereinafter following, when taken in connection with the accompanying drawings, wherein—

Figure 1 represents a side view of trestle or support embodying my invention, and Fig. 2 a cross-section thereof on the line *x x*. Fig. 3 is a view in detail, representing the inner side of the holding-ring and adjustable socket-pieces, and indicating in dotted lines the manner in which the legs may be turned or adjusted in a plane parallel with the length of the beam. Fig. 4 is a view of the ring, taken from the inner side thereof; and Fig. 5 is a side view of the adjustable socket-piece to show its construction. Fig. 6 is a side view of the attaching or holding ring, and Fig. 7 represents the socket-piece as when viewed from the top.

Before proceeding with a description in detail of the construction of parts herein resorted to I desire to state that the devices constituting my invention for the holding and adjustment of the supporting-legs to a greater or less inclination, and by which the structure may be collapsed or folded together, consists, generically, of a ring for attachment to the beam or ledger and a socket fitting within said ring and circularly adjustable therein for the purpose intended.

Reference being had to the several parts by the letters marked thereon, A represents the beam or ledger of a trestle, and B B the supporting-legs therefor. The device constituting my invention, as herein shown, consists of a metallic ring, C, having projections *a a*, through which attachment is made to the beam or ledger, and formed with a continuous annular flange, *c*, the said projections *a a* being perforated, as shown, for the reception of securing screws or bolts *d d*.

D represents an auxiliary to my invention in the shape of a socket-piece formed with a ring, E, fitting within the recess of ring C, formed by the annular flange *c*, the said ring or arc-shaped plate E being so united or joined to the socket-piece D as that an opening, *e*, is formed to permit of the upper end of the legs projecting therethrough slightly, as shown in Figs. 1 and 2. The socket-piece D branches outwardly at a suitable angle, and, preferably, I provide a portion of the periphery of ring E with a series of notches or serrations, *g*, designed to take into or engage projections *h*, formed on the inner side of the holding-ring C. The purpose of these notches is to prevent the socket-piece from slipping out of the positions to which it may be adjusted, yet they are not essential, since I have found that the said socket-pieces will hold to any position brought when the legs have been properly tightened without resorting to the notches. For safety, however, their use is preferred. The ring C is also preferably formed on its inner side or face with pointed projections *i* for entering or biting into the ledger when secured thereto, and the socket-piece D is formed with a slot, *j*, through which a screw or rivet may be inserted to enter the legs and secure them in place within the said socket-pieces.

The operation of my invention is as follows:

The socket-piece D is slipped through the ring C from the inner side thereof in such manner as to bring the arc-shaped plate E within the seat formed by the annular rim or flange c of the ring, and the latter is then fitted to the side of the ledger or beam and properly secured. The fastenings being made to the opposite sides of the ledger at the proper points, the legs B B are inserted, and it will be seen that adjustments thereof may be made to almost any inclination by simply taking hold of them and turning them to the right or left, a slight draw or pull on them at their lower ends being only necessary to release the engagement of the notches g and projections h.

It will be understood that after the proper adjustments of the legs are made any weight imposed upon the trestle in use will tend to bind them tighter. It will be further seen that where a number of trestles embodying my improvements are to be transported or shipped they may be readily collapsed or folded together by loosening the socket-pieces and turning the legs inwardly toward each other, thereby bringing them alongside the beams and occupying the least possible amount of space; and in order that the legs may be brought closer together attachment of one pair thereof is made slightly lower than the other, as will be seen from the points marked 1 and 2, Fig. 1.

From the foregoing description it is thought the construction and operation of my invention will be fully understood, and while I have herein shown and described certain details of construction and arrangement I desire to state that various modifications thereof could be made and still come within the scope of my invention.

Having thus described my invention, what I claim as new, and desire to secure by Letters Patent, is—

1. In a trestle, the combination of rings for attachment to the ledger, having a continuous annular flange, and socket-pieces circularly adjustable in said rings, having an arc-shaped portion seated within said annular flanges, the said socket-pieces being designed for the reception of supporting-legs, substantially as described.

2. In a trestle, the combination of a ring for attachment to the side of the ledger, having continuous flange and formed with projections on its inner side, and a socket-piece circularly adjustable in said ring, designed for the reception of a supporting-leg, and formed with the arc-shaped portion having notches on a portion of its periphery adapted to engage the projections of the ring, substantially as described.

3. In a trestle, the combination of the rings C, for attachment to the sides of the ledger, having continuous flange c, and provided with projections h, and the socket-piece D, provided with portion E, fitting the ring and having notches g, the said socket being also formed with the opening e and slot j, substantially as described.

In testimony whereof I affix my signature in presence of two witnesses.

GEORGE W. ZEIGLER.

Witnesses:
E. EVERETT ELLIS,
CURTIS LAMMOND.